United States Patent
Oh et al.

(10) Patent No.: US 12,548,199 B2
(45) Date of Patent: Feb. 10, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 350 days.

(21) Appl. No.: 18/029,563

(22) PCT Filed: Oct. 28, 2021

(86) PCT No.: PCT/KR2021/015306
§ 371 (c)(1),
(2) Date: Mar. 30, 2023

(87) PCT Pub. No.: WO2022/092852
PCT Pub. Date: May 5, 2022

(65) Prior Publication Data
US 2023/0377203 A1    Nov. 23, 2023

(30) Foreign Application Priority Data
Oct. 30, 2020  (KR) .................. 10-2020-0143675

(51) Int. Cl.
*G06T 9/00*    (2006.01)
*G06T 9/40*    (2006.01)

(52) U.S. Cl.
CPC ................ *G06T 9/001* (2013.01); *G06T 9/40* (2013.01)

(58) Field of Classification Search
None
See application file for complete search history.

(56) References Cited

U.S. PATENT DOCUMENTS

2017/0347122 A1   11/2017  Chou et al.
2019/0310378 A1   10/2019  Ho
(Continued)

FOREIGN PATENT DOCUMENTS

WO    2020-189296 A1    9/2020

OTHER PUBLICATIONS

J. Kammerl, N. Blodow, R. B. Rusu, S. Gedikli, M. Beetz and E. Steinbach, "Real-time compression of point cloud streams," 2012 IEEE International Conference on Robotics and Automation, Saint Paul, MN, USA, 2012, pp. 778-785, doi: 10.1109/ICRA.2012.6224647. (Year: 2012).*

(Continued)

*Primary Examiner* — S J Park
*Assistant Examiner* — Caroline E. Depalma
(74) *Attorney, Agent, or Firm* — Bryan Cave Leighton Paisner LLP

(57) ABSTRACT

A point cloud data transmission method according to embodiments may comprise the steps of encoding point cloud data, and transmitting a bitstream including the point cloud data. A point cloud data reception method according to embodiments may comprise the steps of receiving a bitstream comprising point cloud data, and decoding the point cloud data.

15 Claims, 29 Drawing Sheets

(56) References Cited

U.S. PATENT DOCUMENTS

2020/0043182 A1    2/2020   Janus et al.
2020/0296427 A1*  9/2020   Ricard .................. H04N 19/186

OTHER PUBLICATIONS

Graziosi D, Nakagami O, Kuma S, Zaghetto A, Suzuki T, Tabatabai A. An overview of ongoing point cloud compression standardization activities: video-based (V-PCC) and geometry-based (G-PCC). APSIPA Transactions on Signal and Information Processing. 2020;9:e13. doi: 10.1017/ATSIP.2020.12 (Year: 2020).*

"G-PCC codec description v8", SO/IEC JTC 1/SC 29/WG 11 Coding of moving pictures and audio Convenorship: JISC ( Japan ). Oct. 2, 2020. N19525.

Information technology—MPEG-I (Codedd Representation of Immersive Media)—Part 9: Geometry-based Point Cloud Compression, ISO/IEC 23090-9:2019(E), 89 pages, 2019.

Oh et al. " [G-PCC] Slice segmentation considering coding layers," International Organisation for Standardisation Organisation International De Normalisation ISO/IEC JTC 1/SC 29/WG 7 Coding of Moving Pictures and Audio, ISO/ IEC JTC 1/SC 29/WG7 M 55350, 6 pages, Oct. 2020.

Hur et al. "[G-PCC] [New Proposal] on improved spatial scalable lifting," International Organisation for Standardisation Organisation International De Normalisation ISO/IEC JTC 1/SC 29/WG 11 Coding of Moving Pictures and Audio, ISO/IEC JTC 1/SC 29/WG11 M51408, 7 pages, Oct. 2019.

* cited by examiner

FIG. 6
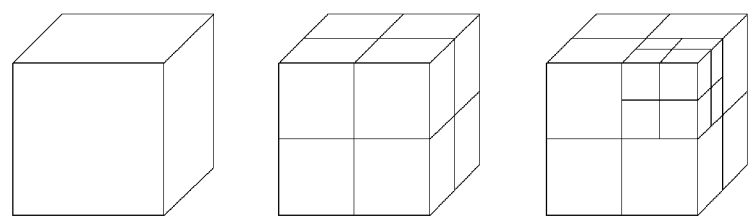
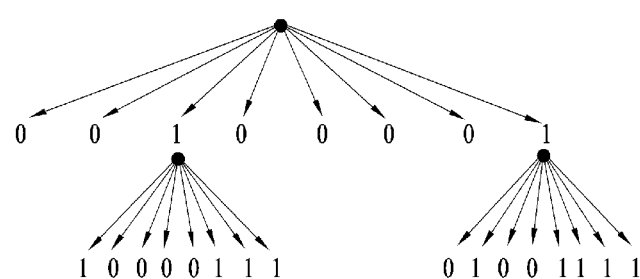

FIG. 7
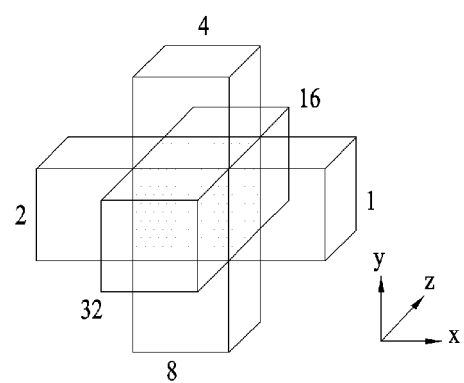
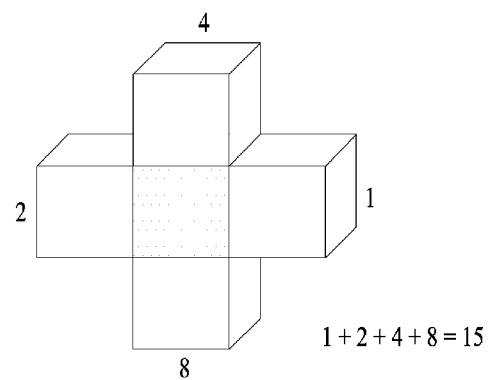
$1 + 2 + 4 + 8 = 15$

FIG. 24

| scalable_lifting_lod_generation_info( ) { | Descriptor |
|---|---|
|   top_down_LoD_generation_flag | u(1) |
|   if( top_down_LoD_generation_flag ) { | |
|     first_depth_sampling_direction_present_flag | u(1) |
|     if ( first_depth_sampling_direction_present_flag ) | |
|       first_depth_sampling_direction_forward_flag | u(1) |
|   } | |
|   else { | |
|     num_full_octree_depth | u(8) |
|     for( i=0; i<num_full_octree_depth;i++ ) | |
|       child_node_sampling_forward_direction_flag[i] | u(1) |
|       child_node_sampling_position[i] | u(3) |
|   } | |
| } | |

| attribute_parameter_set( ) { | Descriptor |
|---|---|
|   ...... | |
|   lifting_scalability_enabled_flag | u(1) |
|   if ( lifting_scalability_enabled_flag ) { | |
|     lifting_max_nn_range_minus1 | u(2) |
|     scalable_lifting_lod_generation_info( ) | |
|   } | |
|   ...... | |
| } | |

| scalable_lifting_info_sei( ) { | Descriptor |
|---|---|
|   scalable_lifting_lod_generation_info( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage filing under 35 U.S.C. 371 of International Application No. PCT/KR2021/015306, filed on Oct. 28, 2021, which claims the benefit of Korean Patent Application No. 10-2020-0143675, filed on Oct. 30, 2020, all of which are incorporated by reference in their entirety herein.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method of transmitting point cloud data may include encoding the point cloud data, and transmitting a bitstream containing the point cloud data. A method of receiving point cloud data according to embodiments may include receiving a bitstream containing point cloud data and decoding the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 24 shows scalable lifting LOD generation information, an attribute parameter set, and scalable lifting information SEI according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
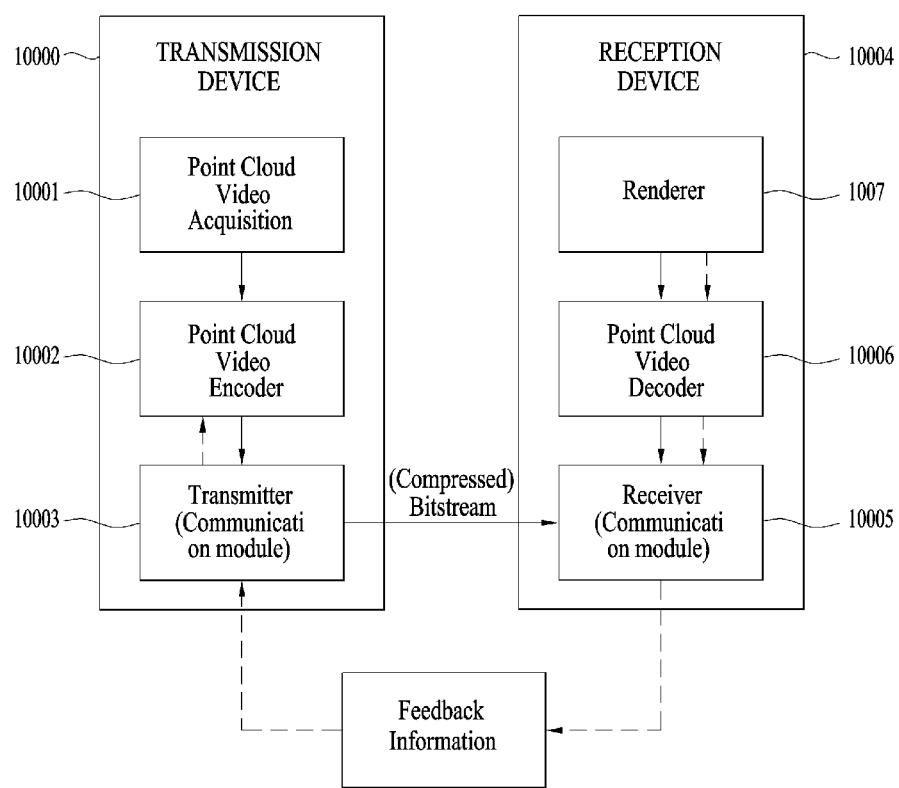
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
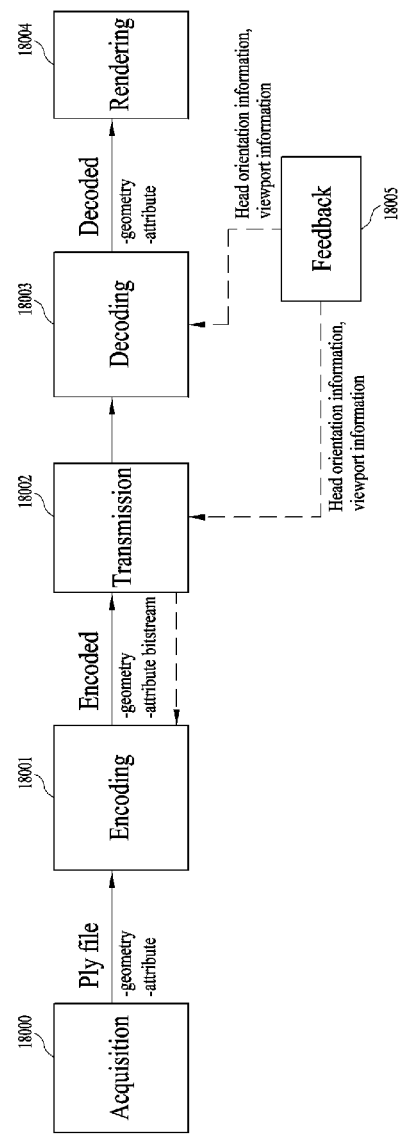
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream.

According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
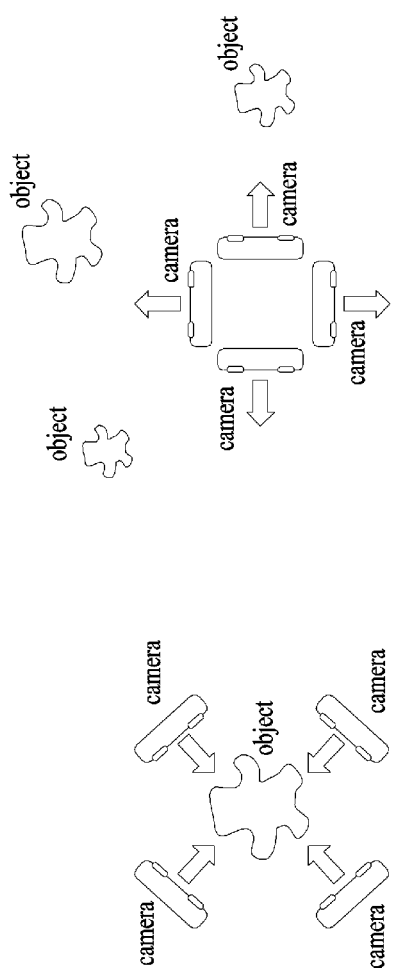
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
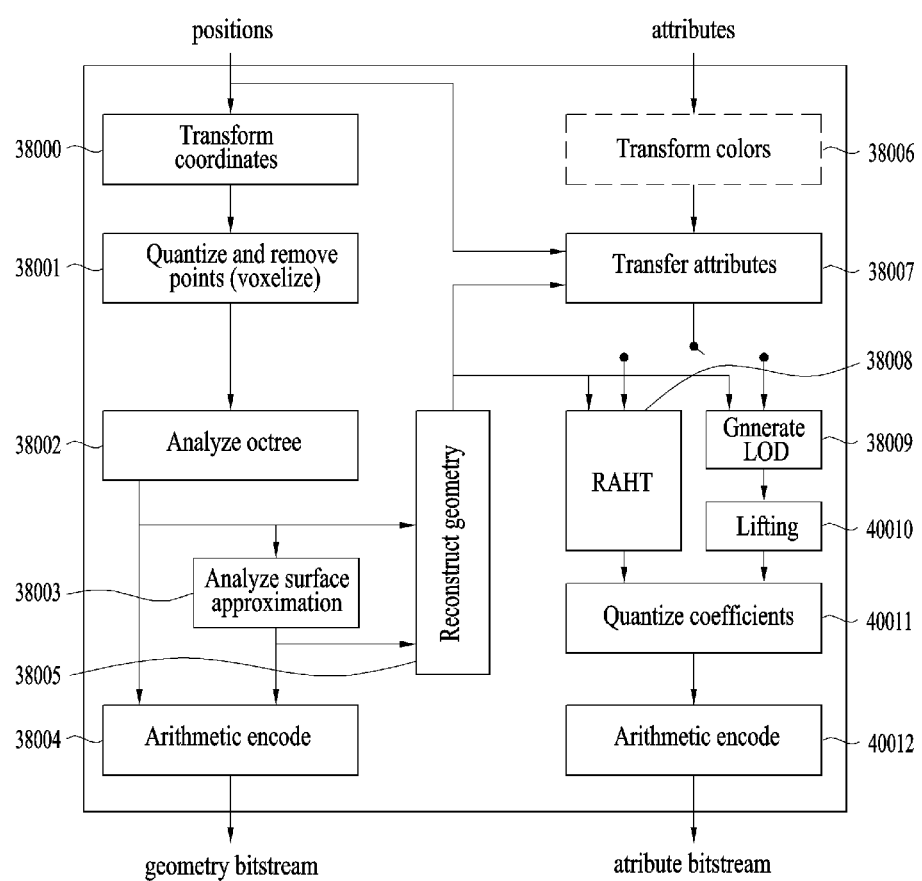
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) may be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
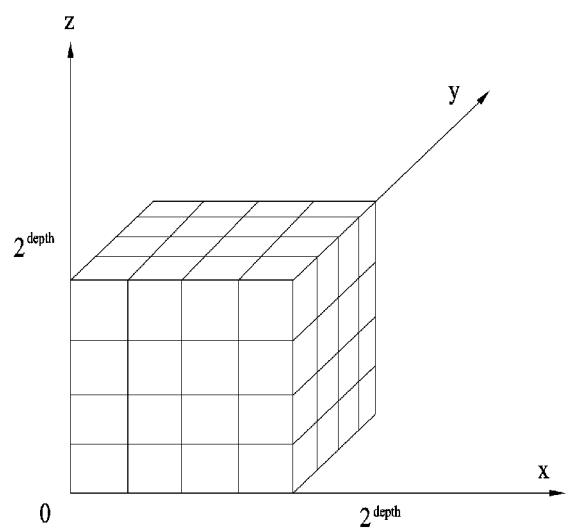
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$)

Here, 2d may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d=\text{Ceil}(\text{Log }2(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta$x, $\Delta$y, $\Delta$z) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \quad \text{i)}$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1 Triangles formed from vertices ordered 1, . . . , n n triangles
3 (1,2,3)
4 (1,2,3), (3,4,1)
5 (1,2,3), (3,4,5), (5,1,3)
6 (1,2,3), (3,4,5), (5,6,1), (1,3,5)
7 (1,2,3), (3,4,5), (5,6,7), (7,1,3), (3,5,7)
8 (1,2,3), (3,4,5), (5,6,7), (7,8,1), (1,3,5), (5,7,1)
9 (1,2,3), (3,4,5), (5,6,7), (7,8,9), (9,1,3), (3,5,7), (7,9,3)
10 (1,2,3), (3,4,5), (5,6,7), (7,8,9), (9,10,1), (1,3,5), (5,7,9), (9,1,5)
11 (1,2,3), (3,4,5), (5,6,7), (7,8,9), (9,10,11), (11,1,3), (3,5,7), (7,9,11), (11,3,7)
12 (1,2,3), (3,4,5), (5,6,7), (7,8,9), (9,10,11), (11,12,1), (1,3,5), (5,7,9), (9,11,1), (1,5,9)

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
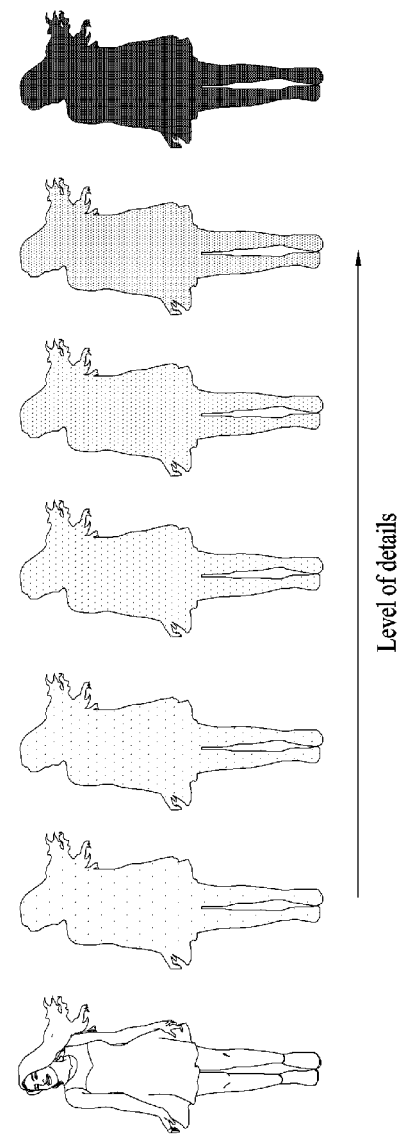
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
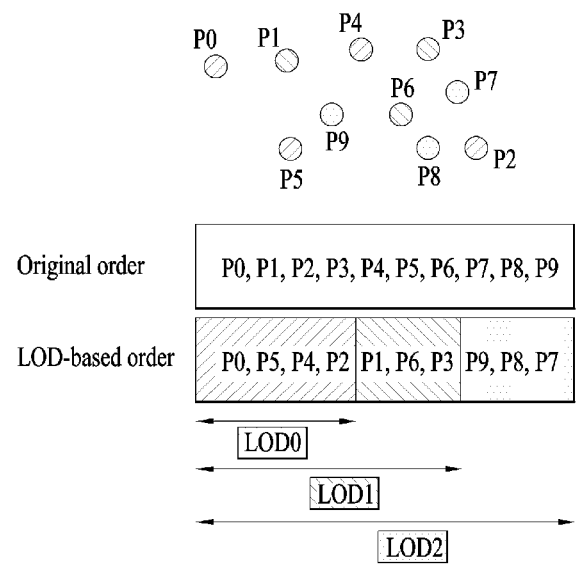
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

| TABLE |
|---|
| Attribute prediction residuals quantization pseudo code |
| int PCCQuantization(int value, int quantStep) {<br>  if( value>=0) {<br>    return floor(value / quantStep + 1.0/ 3.0);<br>  } else {<br>    return -floor(-value / quantStep + 1.0 /3.0);<br>  }<br>} |

| TABLE |
|---|
| Attribute prediction residuals inverse quantization pseudo code |
| int PCCInverseQuantization(int value, int quantStep) {<br>  if( quantStep ==0) {<br>    return value;<br>  } else {<br>    return value * quantStep;<br>  }<br>} |

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h0_{0,0,0} \end{bmatrix} = T_{w1000 w1001} \begin{bmatrix} g_{1_{0,0,0z}} \\ g_{1_{0,0,1}} \end{bmatrix}$$

Figure 10:
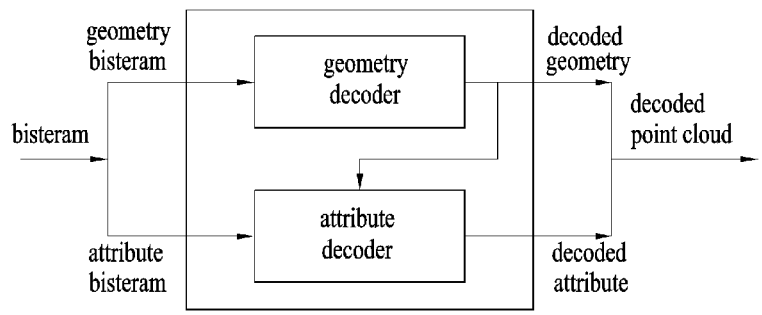
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
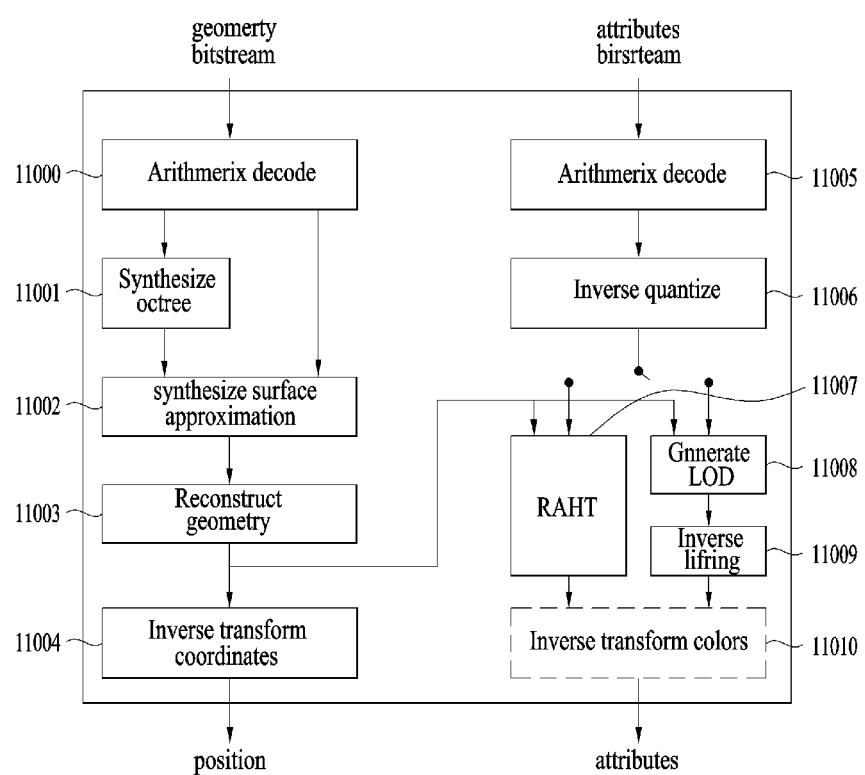
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
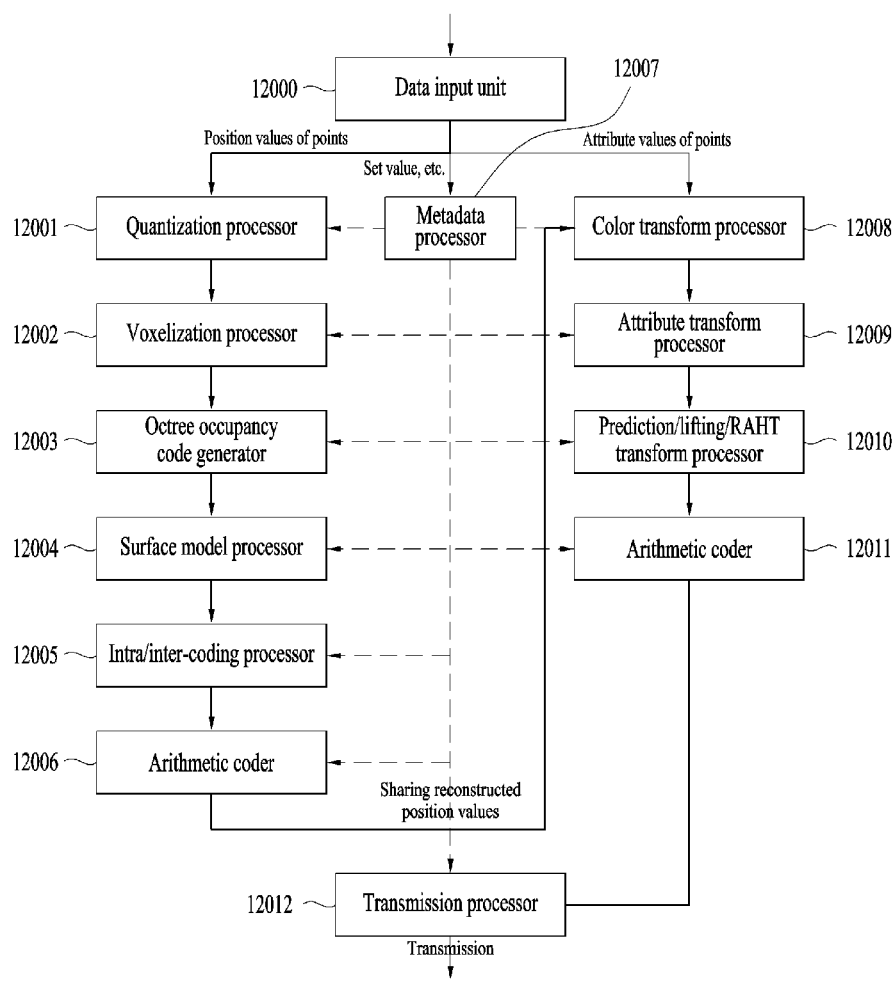
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
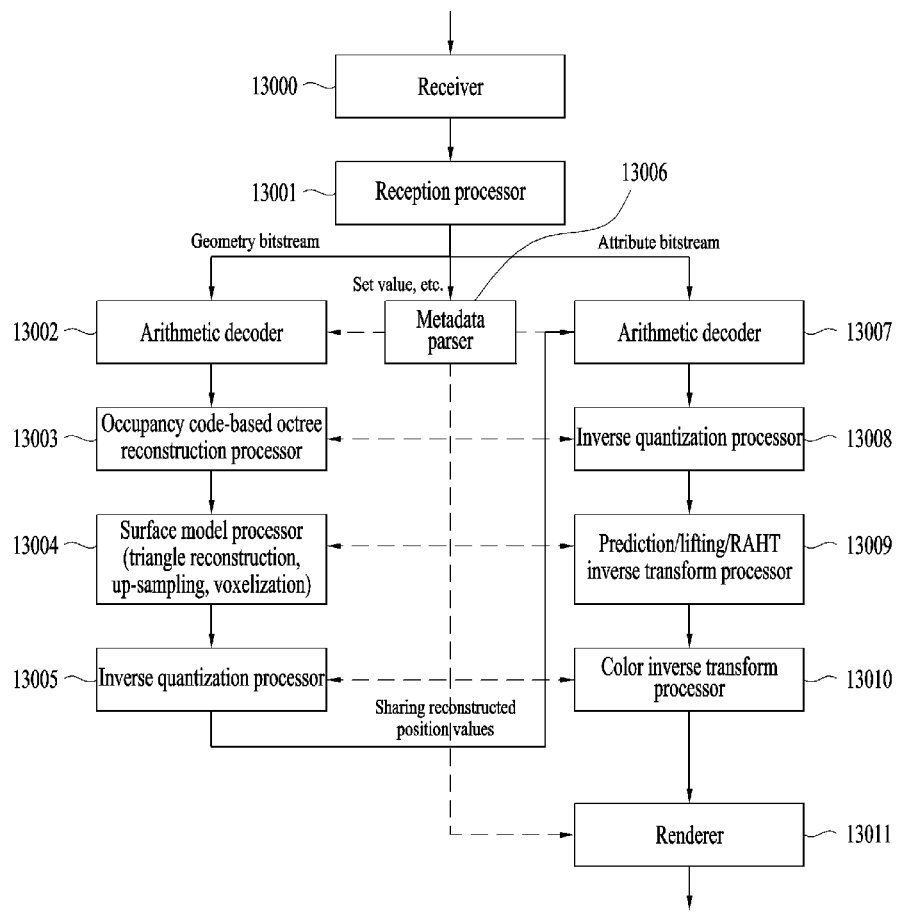
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
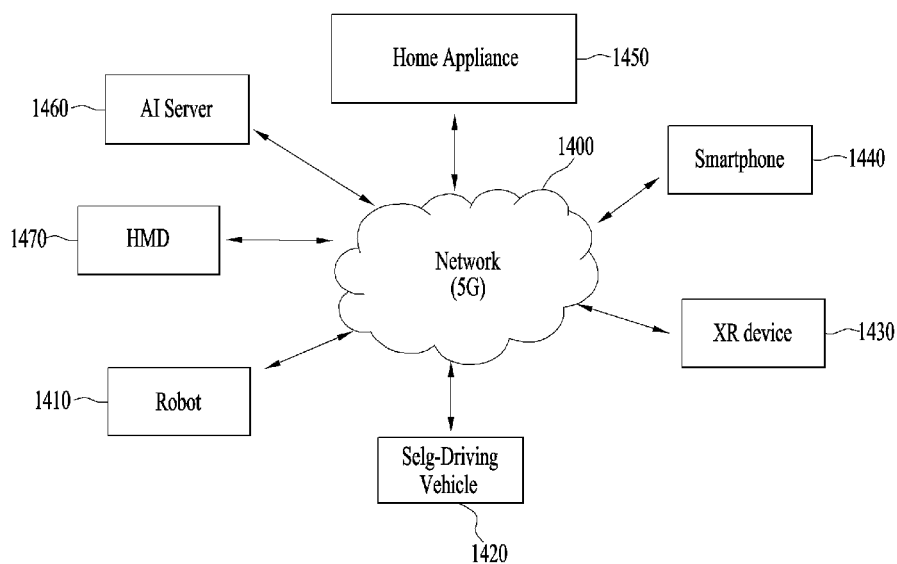
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
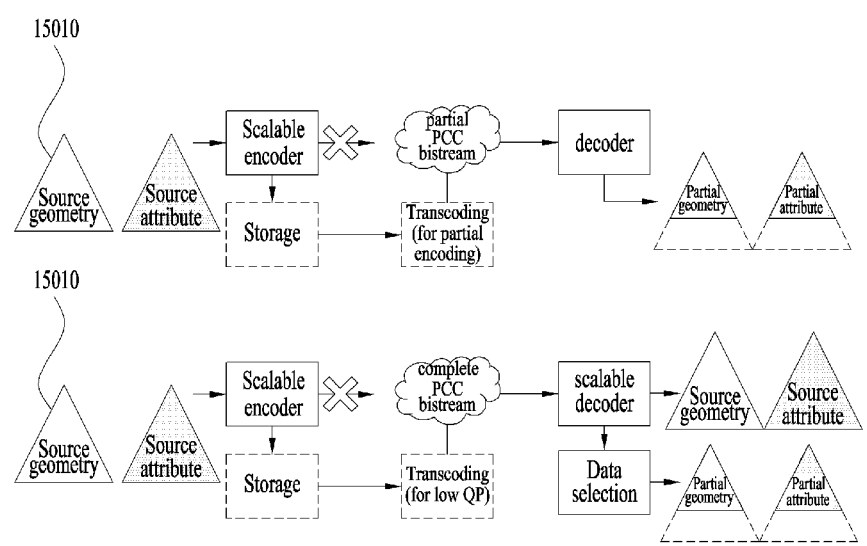
FIG. 15 illustrates scalable transmission according to embodiments.
Figure 16:
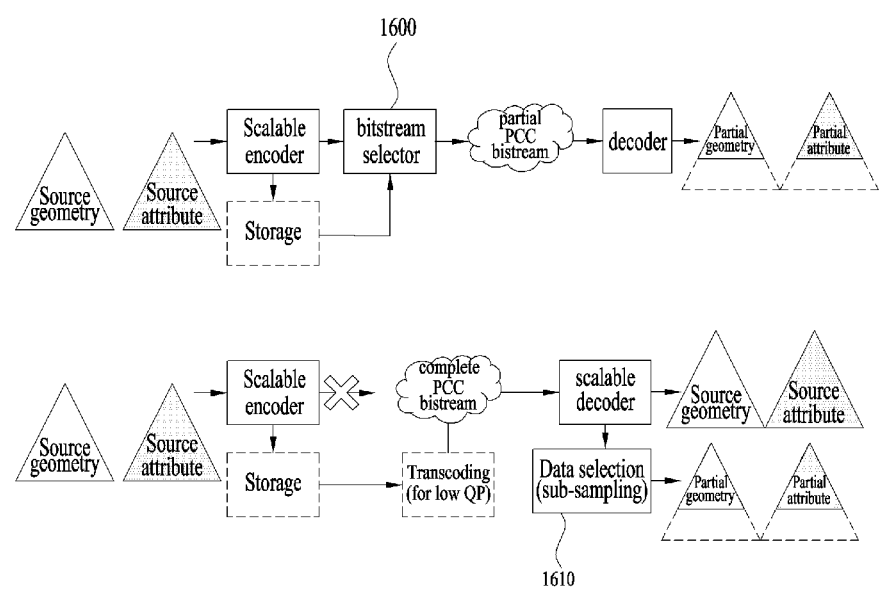
FIG. 16 illustrates a partial bitstream transmission procedure according to embodiments.
Figure 18:
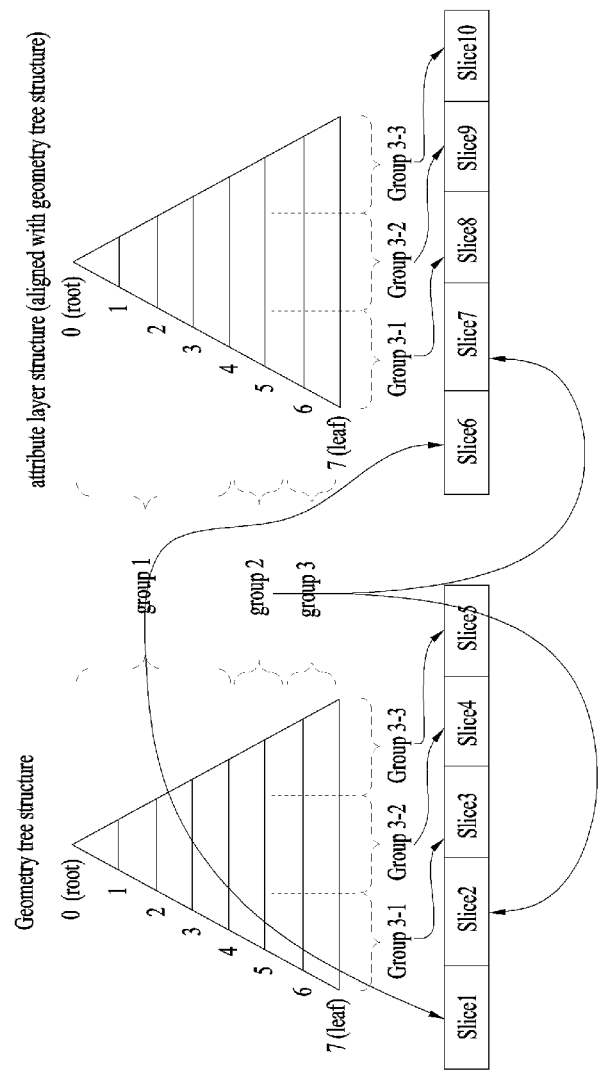
FIG. 18 shows layer groups for scalable transmission according to embodiments.
Figure 25:
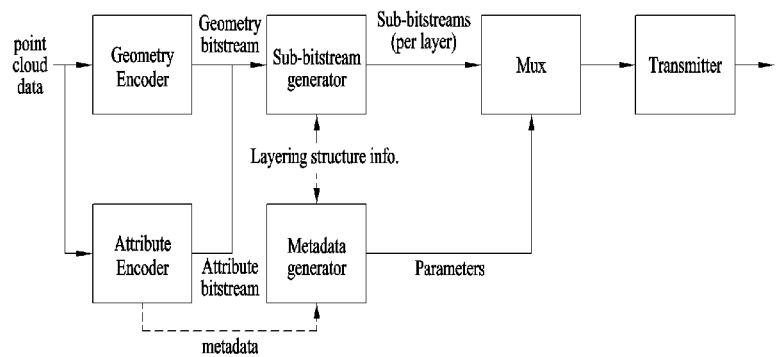
FIG. 25 illustrates a point cloud data transmission device according to embodiments.

The point cloud data transmission method/device according to embodiments may be construed as a term referring to the transmission device 10000 in FIG. 1, the point cloud video encoder 10002 in FIG. 1, the transmitter 10003 in FIG. 1, the acquisition 20000/encoding 20001/transmission 20002 in FIG. 2, the encoder in FIG. 4, the transmission device in FIG. 12, the device in FIG. 14, the encoder in FIG. 18, the transmission device in FIGS. 15, 16, and 25, and the like.

Figure 19:
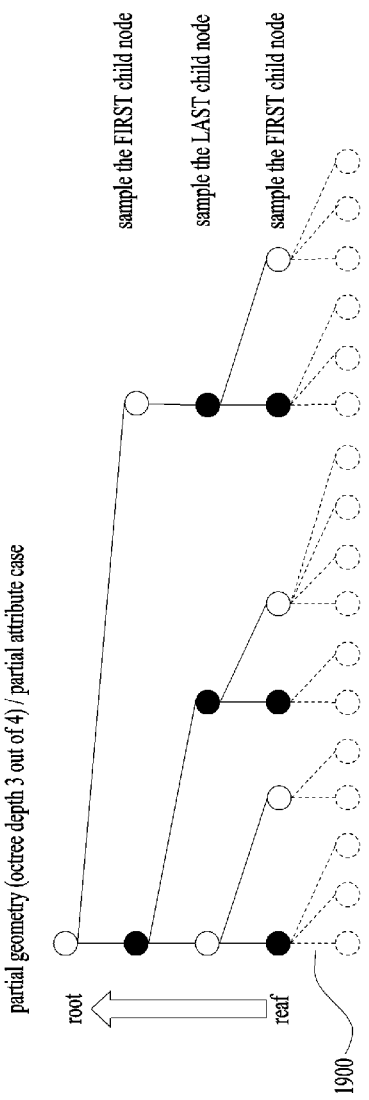
FIG. 19 illustrates a mismatch between an encoder and a decoder according to embodiments.

The point cloud data reception method/device according to embodiments may be construed as a term referring to the reception device 10004 in FIG. 1, the receiver 10005 in FIG. 1, the point cloud video decoder 10006 in FIG. 1, the transmission 20002/decoding 20003/rendering 20004 in FIG. 2, the decoder in FIGS. 10 and 11, the reception device in FIG. 13, the device in FIG. 14, the decoder in FIG. 19, the reception device/method in FIGS. 15, 16, 26, and 27, and the like.

The method/device for transmitting or receiving point cloud data according to the embodiments may be referred to simply as a method/device.

According to embodiments, geometry data, geometry information, and position information constituting point cloud data are to be construed as having the same meaning. Attribute data, attribute information, and attribute information constituting the point cloud data are to be construed as having the same meaning.

The methods/devices according to embodiments may encode and decode point cloud data based on scalable lifting LOD generation in consideration of partial geometry.

Embodiments may efficiently support a case where selective decoding of a part of data is needed due to receiver performance or transmission speed in transmitting and receiving point cloud data. In this regard, scalable lifting for scalable coding may be used for attribute coding (attribute encoding and/or decoding), and additional operations are included for use in a partial geometry coding environment.

Embodiments address techniques for configuring a data structure composed of a point cloud. Specifically, the embodiments include methods for informing the receiver of a sampling position in consideration of the partial geometry coding environment in generating a scalable LoD for scalable attribute coding.

Referring to FIGS. 4 and 11, the point cloud data processed by the transmission device/reception device according to the embodiments is composed of a position (e.g., XYZ coordinates) and attributes (e.g., color, reflectance, intensity, grayscale, opacity, etc.) of each datum. In point cloud compression (PCC), octree-based compression is performed to efficiently compress distribution characteristics of uneven distribution in three-dimensional space, and attribute information is compressed based thereon. Operations according to the embodiments may be processed by each component device of the PCC transmission/reception device illustrated in FIGS. 4 and 11.

The LoD generation used in scalable lifting may increase compression efficiency by using attributes for a position close to the node center by alternately applying the sampling position according to the octree depth in consideration of the full octree depth geometry. When scalable transmission is supported, partial geometry is supported, which may lead to inconsistency between the encoder and the decoder in terms of the sampling position of the scalable lifting LOD generation. In this case, the partial point cloud may be presented inaccurately. In the case of partial decoding, inconsistencies between geometry and attributes may be resolved by changing or clearly signaling the sampling reference position according to the method according to embodiments.

FIG. 15 illustrates scalable transmission according to embodiments.

The point cloud data transmission method/device according to the embodiments (corresponding to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIG. 18, the transmission device of FIGS. 15, 16, and 25, etc.), and the reception device according to the embodiments (corresponding to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 19, the reception device/method of FIGS. 15, 16, 26, and 27, etc.) may transmit and receive point cloud data in a scalable manner as illustrated in FIG. 15.

The point cloud data transmission method/device divides the position information and feature information such as color/brightness/reflectance related to data points into geometry data and attribute data, respectively, and compresses and delivers the divided data. In this case, an octree structure having layers may be configured according to the degree of detail, or PCC data may be configured according to the level of detail (LoD). Scalable point cloud data coding and representation may be implemented based on the configuration. In this case, only a part of point cloud data may be decoded or represented according to the receiver performance or transmission speed. Additionally, embodiments provide a method to remove unnecessary data in advance. In other words, when only a part of the scalable PCC bitstream needs to be transmitted (when only some layers are decoded in the scalable decoding), only the necessary part cannot be selected and sent. Therefore, the necessary part may be re-encoded after decoding (1500) (Method 1), or the receiver may selectively apply the operation after the entirety is delivered (1510) (Method 2). In the case of Method 1, delay may occur due to time for decoding and re-encoding. In the case of Method 2, bandwidth efficiency may be reduced due to transmission of unnecessary data. Further, when a fixed bandwidth is used, data quality should be lowered for transmission.

FIG. 16 illustrates a partial bitstream transmission procedure according to embodiments.

The point cloud data transmission method/device according to embodiments (corresponding to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIG. 18, the transmission device of FIGS. 15, 16, and 25, etc.), and the reception device according to embodiments (corresponding to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 19, the reception device/method of FIGS. 15, 16, 26, and 27, etc.) may transmit and receive point cloud data in a scalable manner as illustrated in FIG. 16.

When compressed data is divided according to layers and transmitted according to embodiments, only a necessary part of pre-compressed data may be selectively delivered by a bitstream selector 1600 in the bitstream stage without a separate conversion process. In this case, the storage space may be efficiently operated as only one storage space is required per stream. In addition, efficient transmission may be implemented in terms of bitstream selector bandwidth because only necessary layers are selectively transmitted.

Even from the perspective of the receiver (reception device) according to the embodiments, when information for reconstructing the entire PCC data is delivered regardless of the receiver performance, the receiver needs to reconstruct the point cloud data through decoding and then select only data corresponding to a required layer (data selection or sub-sampling). In this case, since the transmitted bitstream is already decoded, a delay may occur in the receiver aiming at low latency or decoding may fail depending on the receiver performance.

When a bitstream according to embodiments is divided into slices and delivered, the receiver may selectively deliver the bitstream to the decoder according to the density of point cloud data to be represented according to decoder performance or an application field. In this case, since selection is performed before decoding, decoder efficiency may be increased, and decoders of various performances may be supported.

The transmission method/device according to the embodiments may transmit a bitstream configured for each layer (slice), and the reception method/device may efficiently represent point cloud data by selective decoding and sub-sampling (1610).

Scalable Coding According to Embodiments

To address this issue, point cloud data may be compressed and delivered to enable scalable transmission. First, a tool capable of supporting scalability may be used in using position and attribute compression. In addition, in delivering compressed data, slices may be subdivided to enable partial decoding, and the basis for determining to select each slice before decoding may be signaled as metadata. That is, information for selecting a slice required by the receiver may be delivered. Scalable transmission may mean supporting the case of delivering or decoding only a part of the bitstream, rather than decoding the entire bitstream, and the result thereof may be low resolution point cloud data.

When scalable transmission is applied to an octree-based geometry bitstream, point cloud data may be constructed with only specific octree layer information about only up to a specific octree layer for the bitstream of each octree layer from root node to leaf node. To this end, there should be no dependence on the lower octree layer information for a target octree layer. This may be a common restriction applied to geometry/attribute coding.

In the case of attribute coding according to the embodiments, when scalable lifting is used, partial decoding may be enabled according to octree depth, as in the case of octree-based geometry coding. In this case, each octree depth may belong to an LoD, and one or more octree depths may be matched to an LoD.

Figure 17:
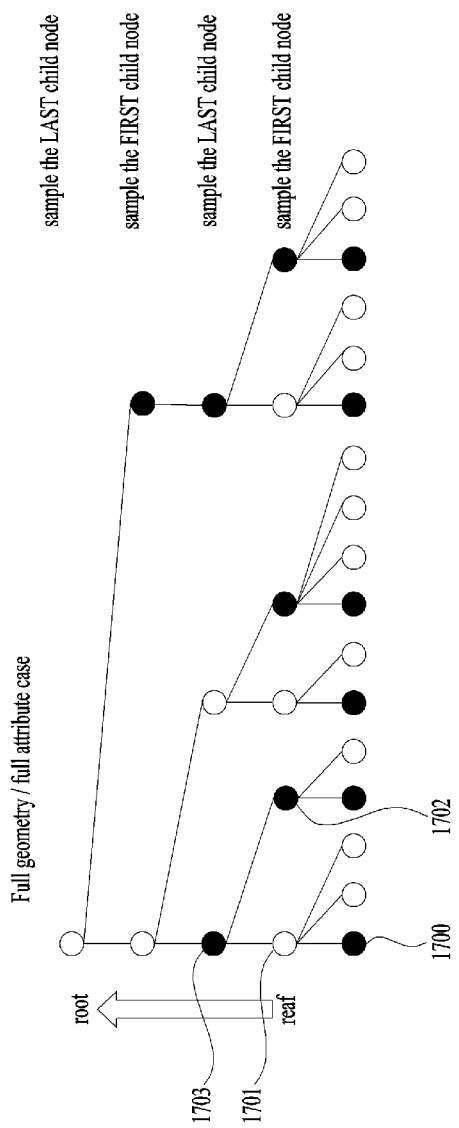
FIG. 17 illustrates an LOD generation method according to embodiments.

FIG. 17 illustrates a LOD generation method according to embodiments.

The point cloud data transmission method/device according to the embodiments (corresponding to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIG. 18, the transmission device of FIGS. 15, 16, and 25, etc.) may encode the point cloud data, for example, attribute data based on LODs.

The reception device according to embodiments (corresponding to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 19, the reception device/method of FIGS. 15, 16, 26, and 27, etc.) may decode the point cloud data, for example, attribute data based on LODs.

FIG. 17 illustrates a method of generating an LoD when a point cloud encoder/decoder, for example, an attribute encoder/decoder, uses scalable lifting.

The figure illustrates a method of selecting an attribute of a parent node as one of the attributes of a child node based on a geometry octree structure. When the octree depth is 4 in FIG. 17, one of the child nodes belonging to octree depth 4 may be selected as an attribute of a node belonging to octree depth 3. Similarly, as an attribute of a node belonging to octree depth 2, one of the attributes of a child node belonging to octree depth 3 may be selected.

According to embodiments, the range for determining the first point (node) and the last point (node) is a group of points belonging to a bundle. That is, it may be a first or last child point for selecting a representative attribute of a parent among child points belonging to one parent.

In this way, scalable lifting may assign (match) attributes to nodes of all octree levels by recursively using a method of selecting the representative attribute of the parent node based on the attributes of the child nodes in the direction from the leaf node to the root node.

The example in FIG. 17 shows a case where the position of a node selected from among child nodes varies depending on the octree level. In this example, the first node (first point) 1700 is used as the attribute of the parent node 1701 when sampling is performed in the leaf node level (octree depth 4), and the last node (last point) 1702 used as the attribute of the parent node 1703 when sampling is performed in octree depth 3. Nodes marked with colored circles represent positions (points, nodes) selected as attributes of the parent node of the nodes.

FIG. 17 illustrates a case of encoding and decoding of full geometry data and full attribute data of point cloud data. That is, one slice, which is an encoding/decoding unit, contains the entire point cloud data. When a full PCC bitstream is transmitted, the reception device may scalably decode the attribute data up to a specific depth based on the attribute representation structure of the parent node represented by the attribute of a specific child node in FIG. 17.

Embodiments may support both full geometry/attribute processing and partial geometry/attribute processing.

FIG. 18 shows layer groups for scalable transmission according to embodiments.

In addition to FIG. 17, the transmission/reception method/device according to embodiments may configure point cloud data into slices based on a layer structure.

That is, when geometry/attribute coding scheme supports layer-based scalability by the method illustrated in FIG. 17, scalability may be supported before decoding as in scalable transmission applications by configuring slices according to the layer structure. FIG. 18 illustrates a method of configuring a layer group according to an octree structure.

Configuration units constituting point cloud data according to embodiments may include an octree layer of geometry, an octree depth of attributes, LOD, a geometry/attribute layer group, and a geometry/attribute slice. According to embodiments, the units may correspond to each other or one unit may be included in another unit.

FIG. 18-(a) shows a layer group structure of a geometry coding tree.

FIG. 18-(b) shows an aligned layer group structure of an attribute coding tree.

The method/device according to embodiments may generate a slice layer group using a hierarchical structure of point cloud data as shown in FIG. 34.

The method/device according to embodiments may apply segmentation of geometry and attribute bitstreams contained in different slices. In addition, in terms of tree depth, a coding tree structure of geometry and attribute coding and each slice is included in partial tree information may be used.

Referring to FIG. 18, an example of a geometry tree structure and a proposed slice segments is shown.

For example, there are eight layers in the octree, and five slices may be used to include a sub-bitstream of one or more layers. A group represents a group of geometry tree layers. For example, group 1 includes layers 0 to 4, group 2 includes layer 5, and group 3 includes layers 6 and 7. In addition, the group may be divided into three sub-groups. Parent and child pairs are present in each sub-group. Groups 3-1 to 3-3 are sub-groups of group 3. When scalable attribute coding is used, the tree structure is the same as the geometry tree structure. The same octree-slice mapping may be used to create attribute slice segments (FIG. 18-(b)).

Layer group: represents a bundle of layer structural units that occur in G-PCC coding, such as an octree layer and a LoD layer.

Sub-group: may represent a set of adjacent nodes based on position information for one layer group. Alternatively, a bundle may be configured based on the lowest layer (which is closest to the root, layer 6 in group 3 of FIG. 34) in the layer group. A bundle of adjacent nodes may be configured by Malton code order, or may be configured based on the distance or according to coding order. Additionally, nodes in a parent-child relationship may be defined to be present within one sub-group.

When a sub-group is defined, a boundary occurs in the middle of the layer. Regarding whether continuation is maintained at the boundary, continuation from the previous slice may be maintained by indicating whether entropy is continuously used through, for example, sps_entropy_continuation_enabled_flag and gsh_entropy_continuation_flag and indicating ref_slice_flag.

When such a structure is used, it is necessary to deliver a scalable structure for selecting a scalable layer by the transmitter/receiver. Considering the octree structure, all octree layers may support scalable transmission. Alternatively, scalable transmission may be allowed only for a specific octree layer and lower layers. When some of the octree layers are included, a scalable layer in which the slice is included may be indicated. Thereby, it may be determined whether the slice is necessary/unnecessary at the bitstream stage. For example, one scalable layer may be configured without supporting scalable transmission from the root node to a specific depth, and the subsequent octree layers may be configured to match scalable layers in a one-to-one correspondence manner. In general, scalability may be supported for a part corresponding to a leaf node. When multiple octree layers are included in a slice as shown in the figure, one scalable layer may be defined to be configured for the layers.

According to embodiments, tree depth, tree level, layer, layer group, and the like are used to complement each other and interpreted as terms referring to a specific level between the root and the leaf in the hierarchical structure (tree) of point cloud data. In addition, groups, slices, etc. are interpreted as complementary to each other as units constituting sub-bitstreams in generating a bitstream for a layering structure based on a hierarchical structure.

In this case, scalable transmission and scalable decoding may be used separately according to the purpose. The scalable transmission may be used at the transmitting/receiving side for the purpose of selecting information up to a specific layer without involving a decoder. The scalable decoding is used to select a specific layer during coding. That is, the scalable transmission may support selection of necessary information without involving a decoder in a compressed state (in the bitstream stage), such that the information may be transmitted or determined by the receiver. On the other hand, the scalable decoding may support encoding/decoding data only up to a required part in the encoding/decoding process, and may thus be used in such a case as scalable representation.

In this case, the layer configuration for scalable transmission may be different from the layer configuration for scalable decoding. For example, the three bottom octree layers including leaf nodes may constitute one layer in terms of scalable transmission. However, when all layer information is included in terms of scalable decoding, scalable decoding may be performed for each of leaf node layer n, leaf node layer n−1, leaf node layer n−2.

Attribute Coding Considering Partial Geometry According to Embodiments

When scalable transmission is used, partial decoding of geometry and attributes may be performed. In this case, there m ay be a difference between the encoded octree depth and the decoded octree depth. In this case, in scalable lifting (attribute coding), in which LoD generation is performed based on full octree depth, mismatch may occur due to the difference between encoding/decoding octree depths.

FIG. 19 illustrates a mismatch between an encoder and a decoder according to embodiments.

The encoder of FIGS. 19 to 22 may be the point cloud data transmission method/device according to the embodiments (corresponding to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIG. 18, the transmission device of FIGS. 15, 16, and 25, etc.), and may encode the point cloud data, for example, attribute data based on LODs.

The decoder of FIGS. 19 to 22 may be the reception device according to embodiments (corresponding to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 19, the reception device/method of FIGS. 15, 16, 26, and 27, etc.), and may decode the point cloud data, for example, attribute data based on LODs.

For example, referring to the tree structure described above, when scalable lifting LoD generation is performed for octree depth 4, the first node (first point) may be selected from among the child nodes for the leaf node level, the last node (last point) may be selected (sampled) from among the children for the leaf node level+1, and the first node (first point) may be selected among the children for the leaf node level+2 as a representative attribute of a higher node. In other words, the first and the last may be alternately selected for each level (octree layer, octree depth) each time the octree depth decreases (or increases). This may increase coding efficiency as a method for selecting a node close to the center of the parent node. However, it may raise the following issues in the partial geometry situation because it assumes a full octree depth.

Referring to the table in FIG. 19, the transmission method/device (encoder) according to the embodiments encodes octree depth 4 to transmit a bitstream containing encoded point cloud data. The reception method/device (decoder) according to the embodiments receives the bitstream and decodes the point cloud data. In this case, partial decoding may be performed up to octree depth 3. Decoding may be performed through scalable lifting LOD generation. In the scalable lifting LoD generation, node selection (sampling) is performed by alternately selecting the first and last child nodes from among the points (nodes) in the corresponding level from the leaf node level up to the root node level.

Since the decoded geometry octree depth is 3 (1900), the scalable lifting LOD generation of the receiver selects the first point from among the child nodes at octree level 3 and the last point from among the child nodes at octree level 2. However, this scheme causes a point selected on the transmitting side to be different from a point selected on the receiving side. In other words, it results in selecting an attribute different from that in the scalable lifting LoD generation performed based on octree depth 4 at the time of encoding, and yields a partial point cloud different from the intention of the encoder. This mismatch makes it impossible to restore point cloud data having attributes suitable for the position.

Figure 20:
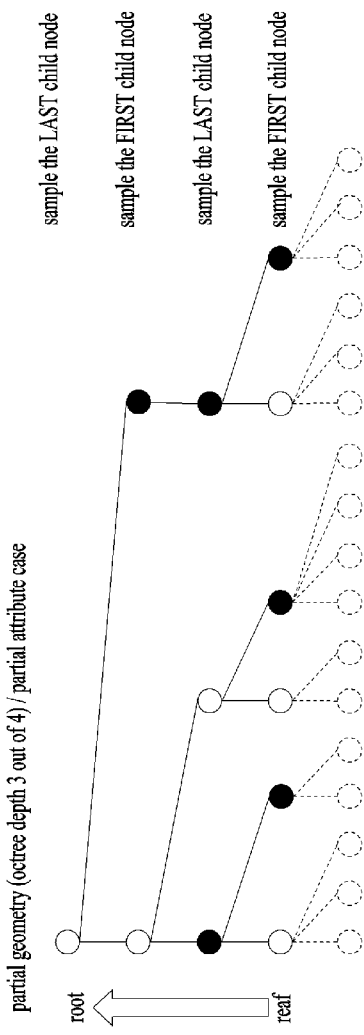
FIG. 20 illustrates a method to address a mismatch between the encoder and the decoder according to embodiments.

FIG. 20 illustrates a method to address a mismatch between the encoder and the decoder according to embodiments.

The method to address the mismatch that occurs during scalable lifting LoD generation due to partial geometry according to embodiments is carried out as follows.

The method/device according to the embodiments may signal a sampling position. That is, sampling positions for each level (octree level, octree depth) may be transmitted to the receiver as signaling information, respectively.

In addition, by delivering information about the full octree depth, exact sampling positions between transmission and reception methods/devices may be used even in partial geometry situations. With this method, partial geometry & attribute may be supported through signaling without changing the existing encoder/decoder.

The full tree depth of point cloud data ranges from 0 to 4. However, when partial geometry/attributes are coded, the nodes processed for each depth must match for scalable coding of partial attributes that match the partial geometry.

For example, as shown in FIG. 20, in the case of partial processing of octree depths 0 to 3, attribute scalable coding may be performed by sampling the last node at depth 1, the first node at depth 2, and the last node at depth 3. Even in reconstructing the point cloud data, sampling may be performed at the same position.

Figure 21:
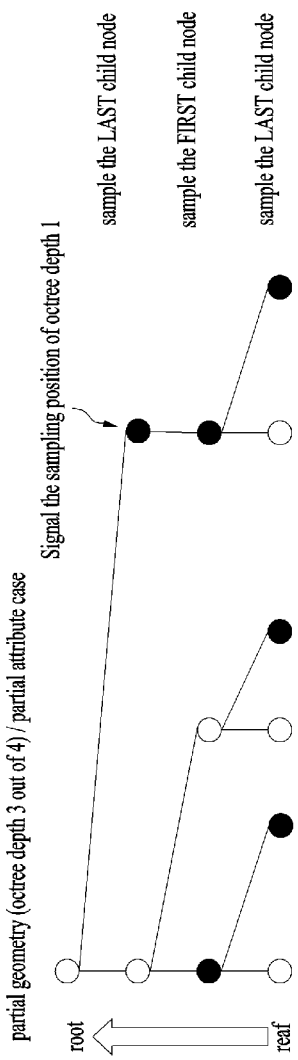
FIG. 21 illustrates a method to address a mismatch between the encoder and the decoder according to embodiments.

FIG. 21 illustrates a method to address a mismatch between the encoder and the decoder according to embodiments.

FIG. 21 illustrates a method to address the mismatch according to embodiments, like FIG. 20.

A sampling position for octree depth 1, the level of the root node, or level root+1 (i.e., the depth or level at which a child node belonging to the root node is present) may be signaled. Partial geometry decoding is a method of discarding consecutive octree levels from the leaf node level (through representative attribute sampling). Accordingly, when sampling information for octree depth 1, which is always decoded, is delivered, subsequent sampling positions may be applied alternately according to octree depth.

For example, as shown in FIG. 21, when the sampling position for octree depth 1 is the last child node, the sampling position for the subsequent octree depth is the first child node, and the sampling position for the next depth (level) may be inferred to be the last child node. With this method, partial geometry & attribute may be supported through signaling without changing the existing encoder/decoder.

FIG. 21 illustrates a case where the full depth is 4, but the geometry/attribute is partially encoded and/or decoded up to depth 3. In this case, in order to prevent the sampling position from being changed due to the difference from the full depth for encoding in decoding the attributes, the sampling position of depth 1 may be signaled to the decoder by metadata. For example, information indicating that the first node has been sampled at depth 1 may be delivered, or information indicating that the last node has been sampled at depth 1 may be delivered. Since the first/last node is alternately sampled from the subsequent (lower) depth of depth 1, the exact sampling position may be inferred.

Figure 22:
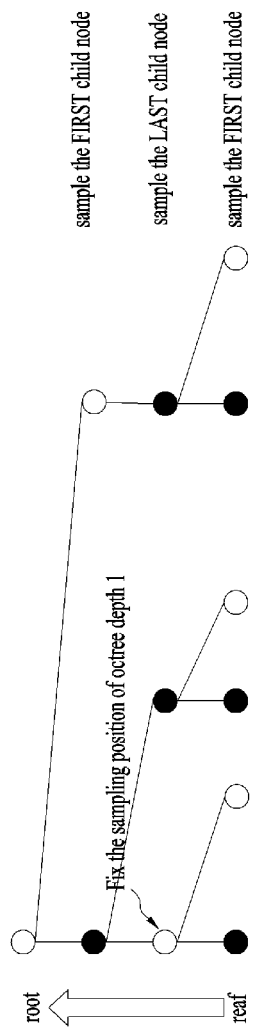
FIG. 22 illustrates a method to address a mismatch between the encoder and the decoder according to embodiments.

FIG. 22 illustrates a method to address a mismatch between the encoder and the decoder according to embodiments.

FIG. 22 illustrates method to address a mismatch according to embodiments, similarly to FIGS. 20 and 21.

The method/device according to embodiments may fix the sampling position for octree depth 1. In this case, contrary to the method of fixing the sampling position for the leaf node level, the sampling position is fixed for octree depth 1. Accordingly, the scalable LoD generation sampling position does not change even when partial geometry coding is performed.

That is, even when partial point cloud data is processed between transmission and reception, the mismatch may be prevented even a fixed position is not used for signaling during encoding.

For example, the attribute value of the root node of depth 0 may be represented by sampling the first node (point) among the nodes belonging to depth 1 (depth to which the child nodes of the root node belong). Alternatively, the value may be represented by sampling the last node (point) among the nodes belonging to depth 1.

If the first-point sampling is invariably used at depth 1, the transmitter/receiver may not infer and recognize without signaling that the last-point sampling is used for depth 2 and the first-point sampling is used for depth 3.

If the last-point sampling is fixed at depth 1, the transmitter/receiver may not infer and recognize without signaling that the first-point sampling is used for depth 2 and the last-point sampling is used for depth 3.

Figure 23:
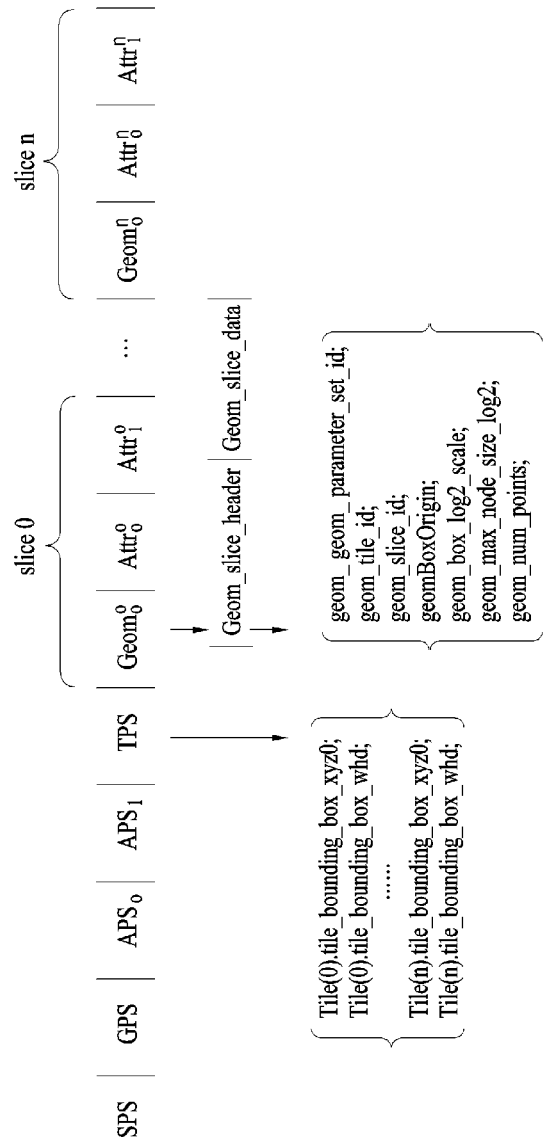
FIG. 23 illustrates a bitstream structure containing point cloud data according to embodiments.

FIG. 23 illustrates a bitstream structure containing point cloud data according to embodiments.

The point cloud data transmission method/device according to the embodiments (corresponding to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIG. 18, the transmission device of FIGS. 15, 16, and 25, etc.) may encode point cloud data, generate parameter information (metadata, signaling information), and generate and transmit a bitstream (FIG. 23) containing the point cloud data and the parameter information.

The point cloud data reception method/device according to embodiments (corresponding to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 19, the reception device/method of FIGS. 15, 16, 26, and 27, etc.) may receive and decode the bitstream (FIG. 23) containing the point cloud data and the parameter information.

Information on the slice-based layering structure according to the embodiments (FIG. 18, etc.) may be defined in a parameter set and an SEI message. For example, related information may be defined in the sequence parameter set, geometry parameter set, attribute parameter set, geometry slice header, and attribute slice header. Depending on the application and system, the range and method to be applied may be defined in a corresponding or separate position and used differently.

That is, a signal may have different meanings depending on the position where the signal is transmitted. If the signal is defined in the SPS, it may be equally applied to the entire sequence. If the signal is defined in the GPS, this may indicate that the signal is used for position reconstruction. If the signal is defined in the APS, this may indicate that the signal is applied to attribute reconstruction. If the signal is defined in the TPS, this may indicate that the signal is applied only to points within a tile. If the signal is delivered in a slice, this may indicate that the signal is applied only to the slice.

In addition, the range and method to be applied may be defined in a corresponding position or a separate position depending on the application or system so as to be used differently. In addition, when the syntax elements defined below are applicable to multiple point cloud data streams as well as the current point cloud data stream, related information may be carried in a superordinate parameter set.

Each abbreviation has the following meaning. Each abbreviation may be referred to by another term within the scope of the equivalent meaning. SPS: Sequence Parameter Set; GPS: Geometry Parameter Set; APS: Attribute Parameter Set; TPS: Tile Parameter Set; Geom (geometry): geometry bitstream=geometry slice header+geometry slice data; Attr (attribute): Attribute bitstream=attribute blick header+attribute brick data.

The information may be defined independently of the coding technique according to embodiments, may be defined in connection with the coding method, or may be defined in the tile parameter set to support locally different scalability. In addition, when the following defined syntax element is applicable to multiple point cloud data streams as well as the current point cloud data stream, information may be carried in a higher concept parameter set.

Alternatively, a bitstream may be selected at the system level by defining a network abstract layer (NAL) unit and delivering related information for selecting layers, such as layer id.

Hereinafter, parameters (which may be referred to as metadata, signaling information, or the like) according to embodiments may be generated in a process of a transmitter according to embodiments described later, and may be transmitted to a receiver according to embodiments so as to be used in a reconstruction.

For example, the parameters according to the embodiments may be generated by a metadata processor (or metadata generator) of a transmission device according to embodiments described later, and may be acquired by a metadata parser of a reception device according to embodiments.

FIG. 24 shows scalable lifting LOD generation information, an attribute parameter set, and scalable lifting information SEI according to embodiments.

FIG. 24 show a syntax element contained in the bitstream of FIG. 23.

top_down_LoD_generation_flag equal to 1 may indicate that the sampling position of the attribute sampling from a child node performed for scalable lifting LoD generation is alternately specified in the top-down direction based on the first sampling depth (e.g., octree depth 1).

The flag equal to 0 may indicate that the sampling position of the attribute sampling from the child node performed for scalable lifting LoD generation is alternately specified in the bottom-up direction based on the leaf node level (which means that the reference for determining the sampling position is changed from bottom to top, and scalable lifting LoD generation is performed in a bottom-up direction).

first_depth_sampling_direction_present_flag equal to 1 may indicate that the sampling position of the attribute sampling from the child node is explicitly delivered for the reference octree depth (e.g., octree depth 1).

The flag equal to 0 may indicate that the sampling position of the attribute sampling from the child node is implicitly delivered. (For example, the first child node or last child node may be implicitly delivered).

first_depth_sampling_direction_forward_flag equal to 1 may indicate that the attribute sampling from the child node is performed in the forward direction. That is, it may indicate that the first node (first point) among the child nodes is sampled for the first depth of sampling. The flag equal to 0 may indicate that the attribute sampling from the child node is performed in the reverse direction. That is, it may indicate that the last node among the child nodes is sampled for the first depth of sampling.

num_full_octree_depth may indicate an octree depth considered in encoding. When top_down_LoD_generation_flag is 0, the sampling direction of scalable lifting LOD generation is determined to be the bottom-up direction. Accordingly, num_full_octree_depth indicating an octree depth considered in the encoding rather than the decoded geometry depth may be provided as a criterion for determining directionality in each octree depth.

child_node_sampling_forward_direction_flag equal to 1 may indicate that the sampling position of the attribute sampling from the child node is explicitly delivered for each octree depth. The flag equal to 0 may indicate that the sampling position of the attribute sampling from the child node is implicitly delivered (e.g., the first child node or last child node is implicitly delivered).

When child_node_sampling_position is equal to 1, the sampling position at each octree level may be directly signaled. child_node_sampling_position equal to 0 may indicate the first node, and child_node_sampling_position equal to 1 may indicate the last node. child_node_sampling_position equal to 2 to 7 may indicate the use of the first to sixth nodes (or the nearest node).

lifting_scalability_enabled_flag equal to 1 specifies that the attribute decoding process allows the pruned octree decode result for the input geometry points. lifting_scalability_enabled_flag equal to 0 specifies that that the attribute decoding process requires the complete octree decode result for the input geometry points. When not present, the value of lifting_scalability_enabled_flag is inferred to be 0. When the value of trisoup_enabled_flag is 0, the value of lifting_scalability_enabled_flag may be 0.

NOTE: When the value of geom_scaling_enabled_flag is equal to 1, the value of lifting_scalability_enabled_flag may be 0 in order to guarantee partial decodability of the geometry point cloud.

lifting_max_nn_range_minus1 plus 1 specifies that maximum nearest neighbour range used to limit the distance of the point registered as neighbor. The value of lifting_max_nn_range indicates the number of octree nodes around the point.

FIG. 25 illustrates a point cloud data transmission device according to embodiments.

FIG. 25 corresponds to a point cloud data transmission method/device according to embodiments, which corresponds to the transmission device 10000 in FIG. 1, the point cloud video encoder 10002 in FIG. 1, the transmitter 10003 in FIG. 1, the acquisition 20000/encoding 20001/transmission 20002 in FIG. 2, the encoder in FIG. 4, the transmission device in FIG. 12, the device in FIG. 14, the encoder in FIG. 18, the transmission device in FIGS. 15 and 16, and the like. Each component of the transmission device according to the embodiments corresponds to hardware, software, a processor, and/or a combination thereof.

The point cloud data transmission device (encoder) receives point cloud data. For example, a geometry encoder and attribute encoder encode geometry and attributes of the point cloud data, respectively.

The encoders may encode position information (geometry data: e.g., XYZ coordinates (Cartesian coordinates), phi-theta coordinates (spherical coordinates), etc.) and attribute information (attribute data: e.g., color, reflectance, intensity, grayscale, opacity, medium, material, glossiness, etc.), respectively.

Each encoder encodes the geometry data to generate a geometry bitstream, and then encodes the attribute data to generate an attribute bitstream. In addition, encoding process information for generating metadata, which is information related to encoding, is delivered to the metadata generator.

The metadata generator generates metadata, which is signaling information about the encoding process. This is because the metadata is required for restoration (decoding) on the receiving side.

A sub-bitstream generator may be connected to or included in each encoder.

The sub-bitstream generator may partition the compressed (encoded) data into units for transmission. The entire bitstream may not be transmitted without being processed. Instead, the bitstream may be partitioned and represented based on layers (data discrimination units) for partial decoding, selective decoding, decoding robust to errors, etc. That is, the bitstream may be divided into appropriate units for selecting information required in a bitstream unit (bitstream level) and packed according to the layering structure information. The bitstream packaging according to the embodiments may generate a layering structure. Sub-bitstreams may be generated for each layer (LOD, slice, subgroup, group, layer-group, etc.). Alternatively, at least two or more layers may be distinguished as sub-bitstreams.

The multiplexer may combine the encoded point cloud data and metadata (parameters in FIG. 23) into one bitstream.

The transmitter transmits the bitstream.

Figure 26:
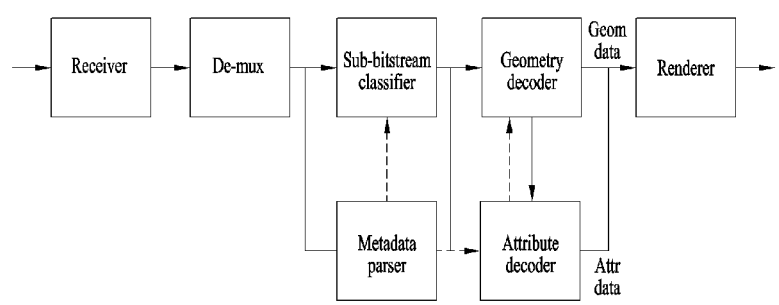
FIG. 26 illustrates a point cloud data reception device according to embodiments.

FIG. 26 illustrates a point cloud data reception device according to embodiments.

Figure 27:
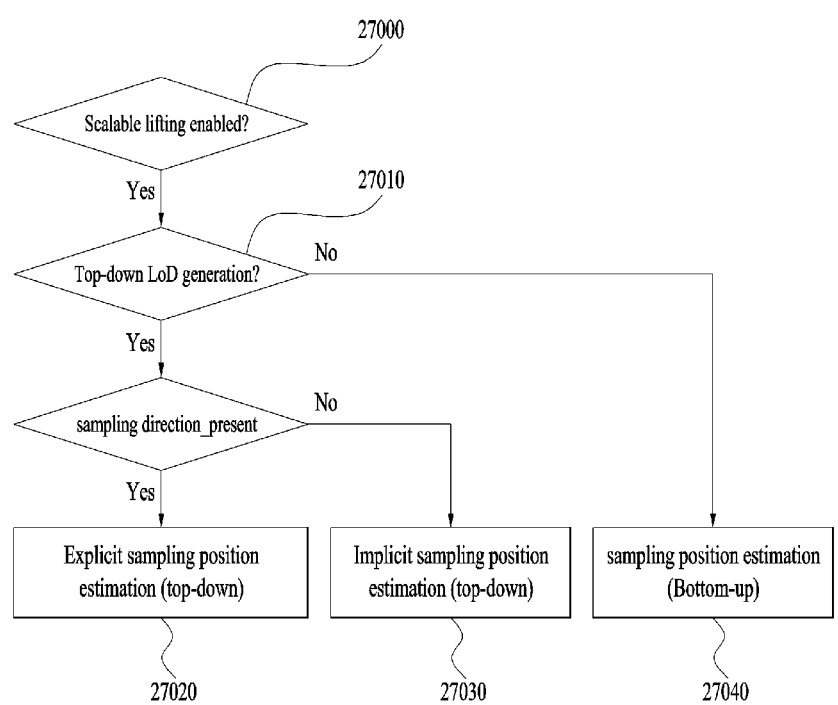
FIG. 27 illustrates a method of decoding point cloud data according to embodiments.

FIG. 26 corresponds to a point cloud data reception method/device according to embodiments, which corresponds to the reception device 10004 in FIG. 1, the receiver 10005 in FIG. 1, the point cloud video decoder 10006 in FIG. 1, the transmission 20002/decoding 20003/rendering 20004 in FIG. 2, the decoder in FIGS. 10 and 11, the reception device in FIG. 13, the device in FIG. 14, the decoder in FIG. 19, the reception device/method in FIGS. 15, 16, and 27, and the like. Each component of the reception device according to the embodiments corresponds to hardware, software, a processor, and/or a combination thereof.

Each operation of the reception device according to the embodiments may follow the same operation as the operation of the corresponding component of the transmission device according to the embodiments, or may follow a reverse process.

The receiver receives a bitstream from the transmission device.

A demultiplexer may receive the bitstream and separate the metadata and point cloud data contained in the bitstream.

A sub-bitstream classifier may divide the point cloud data for each sub-bitstream (or layer). Furthermore, it may divide geometry data and attribute data for each sub-bitstream (or layer).

A metadata parser parses metadata (signaling information and parameters) contained in the bitstream.

A geometry decoder decodes geometry data contained in the bitstream. The geometry decoder may decode the geometry data based on the metadata.

An attribute decoder decodes attribute data contained in the bitstream. The attribute decoder may decode the attribute data based on the metadata.

A renderer may render the point cloud data based on the geometry data and the attribute data.

When a bitstream is input, the receiver may process a bitstream for position information and a bitstream for attribute information separately. In this case, the sub-bitstream classifier may transmit an appropriate sub-bitstream to the decoder based on the information in the bitstream header. Alternatively, in this process, a layer (sub-bitstream) required by the receiver may be selected. The classified bitstream may be reconstructed to geometry data and attribute data according to the characteristics of the data by the geometry decoder and attribute decoder, respectively, and the data may then be converted into a format for final output by the renderer.

FIG. 27 illustrates a method of decoding point cloud data according to embodiments.

FIG. 27 illustrates a procedure of the encoding and decoding according to the embodiment illustrated in FIGS. 19 to 22, based on metadata.

When the transmission method/device according to the embodiments configures and transmits slices of a bitstream in units of layers for scalable transmission, the reception method/device according to the embodiments may perform scalable lifting on the point cloud data based on the metadata in FIGS. 23 and 24. When scalable lifting is used (27000), information of scalable lifting lod_generation_info( ) delivered by an SEI message or APS may be used.

When the top-down LoD generation flag is equal to 1 (27010), the sampling directionality of the top level may be explicitly signaled through first_depth_sampling_direction_forward_flag (when first_depth_sampling_direction_present_flag=1, 27020).

The sampling directionality of the top level according to the embodiments may be used (when first_depth_sampling_direction_present_flag=0, 27030).

When top-down LoD generation is not used, the sampling position may be estimated in the bottom-up direction from num_full_octree_depth through the octree depth information used in encoding, or the position may be specified based on the sampling position of each octree depth given through child_node_sampling_forward_direction_flag or child_node_sampling_position (27040).

Figure 28:
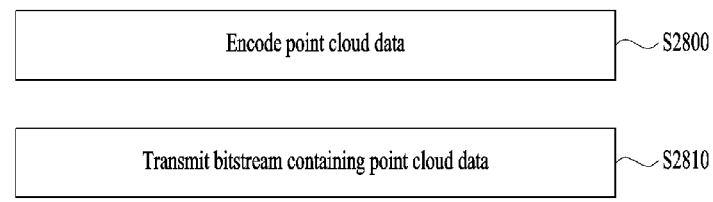
FIG. 28 illustrates a point cloud data transmission method according to embodiments.

FIG. 28 illustrates a point cloud data transmission method according to embodiments.

The point cloud data transmission method/device according to the embodiments (corresponding to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIG. 18, the transmission device of FIGS. 15, 16, 19 to 22, and 25, etc.) may encode and transmit point cloud data using a method as illustrated in FIG. 28.

S2800: The point cloud data transmission method according to the embodiments may include encoding point cloud data. The encoding operation according to the embodiments may include the operations of the transmission device 10000 and point cloud video encoder 10002 in FIG. 1, the encoding 20001 in FIG. 2, the encoder in FIG. 4, the encoder in FIG. 12, the encoding of geometry and attributes in FIG. 15, the encoding of geometry and attributes in FIG. 16, the encoding of geometry and attributes in FIGS. 17 to 22, the bitstream generation in FIGS. 23 and 24, and the geometry/attribute encoder, sub-bitstream generation and metadata generation in FIG. 25.

S2810: The point cloud data transmission method according to the embodiments may further include transmitting a bitstream containing the point cloud data. The transmission operation according to the embodiments may include the operations of the transmission device 10000 and transmitter 10003 in FIG. 1, the transmission 20002 in FIG. 2, the transmission of an encoded bitstream in FIG. 2, the transmission in FIG. 12, transmission of the XR device 1730 in FIG. 14, the partial transmission or full transmission of the geometry and attributes in FIG. 15, the partial transmission or full transmission of the geometry and attributes in FIG. 16, the bitstream transmission in FIGS. 23 and 24, and the transmission of a bitstream containing sub-bitstream and metadata.

Figure 29:
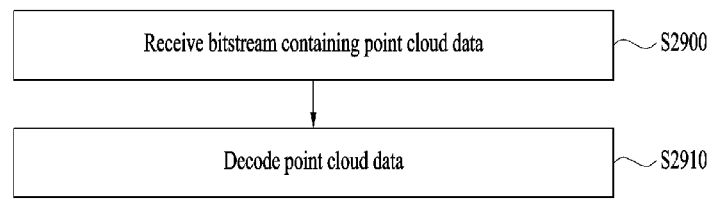
FIG. 29 illustrates a point cloud data reception method according to embodiments.

FIG. 29 illustrates a point cloud data reception method according to embodiments.

The point cloud data reception method/device according to the embodiments (corresponding to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 19, the reception device/method of FIGS. 15, 16, 19 to 22, 26, and 27, etc.) may decode point cloud data using a method as illustrated in FIG. 29.

S2900: The point cloud data reception method according to the embodiments may include receiving a bitstream containing point cloud data. The reception operation according to the embodiments may include the operations of the reception device 10004 and receiver 10005 in FIG. 1, the reception according to the transmission in FIG. 2, the bitstream reception in FIG. 11, the reception in FIG. 13, the reception by the XR device 1730 in FIG. 14, the partial reception or full reception of geometry and attributes in FIG. 15, the partial reception or full reception of geometry and attributes in FIG. 16, the bitstream reception in FIG. 23, the bitstream reception in FIG. 25, and the bitstream reception in FIG. 26.

S2910: The point cloud data reception method according to the embodiments may include decoding the point cloud data. The decoding operation according to the embodiments may include the operations of the reception device 10004 and point cloud video decoder 10006 in FIG. 1, the decoding 20003 in FIG. 2, the decoder in FIGS. 10 and 11, the decoder in FIG. 13, the decoding by the XR device 1730 in FIG. 14, the decoding of geometry and attributes in FIG. 15, the decoding of geometry and attributes in FIG. 16, the decoding of geometry and attributes in FIGS. 17 to 22, the bitstream decoding in FIG. 23, and the sub-bitstream, metadata parser, geometry/attribute decoder, and renderer in FIG. 26.

Referring to FIG. 1, the transmission method according to the embodiments may include encoding point cloud data and transmitting a bitstream containing the point cloud data.

Referring to FIGS. 16 and 18, embodiments may support bitstream selection and transmission based on a layer group. For example, the encoding of the point cloud data may include encoding geometry data of the point cloud data and encoding attribute data of the point cloud data. The encoding of the geometry data may include representing the geometry data as layers based on a tree structure and generating a geometry bitstream containing slices based on one layer or a group including one or more layers. The encoding of the attribute data may include representing the attribute data as layers based on a tree structure, and generating an attribute bitstream containing slices based on one layer or a group including one or more layers.

Regarding the layer structure of point cloud data and slice-based bitstream generation terms such as a layer, a layer group, a tree level, a tree depth, a slice, and a group according to embodiments may be interpreted as corresponding to each other or including or included in another term.

Referring to FIGS. 15 and 16, the transmission method according to the embodiments may include full or partial transmission of the bitstream (scalable transmission). For example, the transmitting may include the transmitting an entirety or part of the bitstream including a geometry bitstream and an attribute bitstream.

Referring to FIGS. 25 and 20, the metadata according to the embodiments may be generated, and a sampling position for each depth may be signaled to the receiving side. For example, the transmission method according to the embodiments may further include generating metadata related to the point cloud data. The metadata may include information indicating a sampling position for a depth of the tree for the attribute data.

Referring to FIGS. 25 and 21, the transmission method according to the embodiments may signal a sampling position for depth 1. For example, the transmission method according to the embodiments may further include generating metadata related to the point cloud data. The metadata may include information indicating a sampling position for a depth having a child node of a root node of the tree for the attribute data.

Referring to FIGS. 25 and 22, the transmission method according to the embodiments may include encoding point cloud data by fixing the sampling position for depth 1. For example, the encoding of the attribute data may include sampling an attribute value of the root node of the tree as an attribute value of a first node among nodes included in the depth having a child node of the root node. The term sampling according to the embodiments means that the attribute value of a child node having the attribute most similar to the attribute of the parent node is selected (sampled) from among the child of the parent node as a value representative of the attribute value of the parent node.

The transmission device according to embodiments corresponds to description of the transmission method. For example, the transmission device may include an encoder configured to encode point cloud data, and a transmitter configured to transmit a bitstream containing the point cloud data.

In addition, the encoder configured to encode the point cloud data may include a geometry encoder configured to encode geometry data of the point cloud data, and an attribute encoder configured to encode attribute data of the point cloud data. The geometry encoder may represent the geometry data as layers based on a structure of a tree, and generate a geometry bitstream containing slices based on one layer or a group including one or more layers. The attribute encoder may represent the attribute data as layers based on the structure of the tree, and generate an attribute bitstream containing slices based on one layer or a group including one or more layers.

In addition, the transmitter may transmit an entirety or part of the bitstream including the geometry bitstream and the attribute bitstream.

In addition, the transmission device according to the embodiments may further include a metadata generator configured to generate metadata related to the point cloud data. The metadata may contain information indicating a sampling position for a depth of the tree for the attribute data (see the metadata syntax).

In addition, the device may further include a metadata generator configured to generate metadata related to the point cloud data. The metadata may contain information indicating a sampling position for a depth having a lower node of a root node of the tree for the attribute data.

In addition, the encoder may sample an attribute value of a root node of the tree as an attribute value of a first node among nodes included in a lower node of the root node.

The reception method according to embodiments may correspond to a specific operation of the transmission method or may perform a reverse process. For example, the reception method may include receiving a bitstream containing point cloud data, and decoding the point cloud data.

Also, referring to FIG. 16, the decoding of the point cloud data may include decoding geometry data of the point cloud data, and decoding attribute data of the point cloud data. The geometry data may be represented as layers based on a structure of a tree and contained in a geometry bitstream containing slices based on one layer or a group including one or more layers. The attribute data may be represented as layers based on the structure of the tree and contained in an attribute bitstream containing slices based on one layer or a group including one or more layers. A layer group-based bitstream may be received, and may be efficiently reconstructed and provided to a user.

In addition, the receiving may include receiving an entirety or part of the bitstream including the geometry bitstream and the attribute bitstream.

The reception method further includes parsing metadata related to the point cloud data. The metadata may contain information indicating a sampling position for a depth of the tree for the attribute data.

The reception method further includes parsing metadata related to the point cloud data. The metadata contains information indicating a sampling position for a depth having a lower node of a root node of the tree for the attribute data.

In addition, the decoding of the attribute data may include sampling an attribute value of a root node of the tree as an attribute value of a first node among nodes included in a lower node of the root node. According to embodiments, the fixed sampling position may be set as a first node, a last node, or the like.

A reception device according to embodiments corresponds to the reception method. For example, the reception device may include a receiver configured to receive a bitstream containing point cloud data and a decoder configured to decode the point cloud data. Furthermore, when partial decoding is performed on geometry data and attribute data based on the metadata, attributes suitable for the corresponding position may be restored through the same sampling position for the tree depth of each datum. Alternatively, attributes suitable for the corresponding position may be restored through a fixed sampling position rather than the metadata.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/"and"," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

As described above, related contents have been described in the best mode for carrying out the embodiments.

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

What is claimed is:

1. A method of encoding point cloud data, the method comprising:
   encoding geometry data of point cloud data based on an octree:
   encoding attribute data of the point cloud data,
   wherein the attribute data is encoded based on the octree,
   wherein a point of a parent node in a first octree level is obtained based on one of points of a child node in a second octree level,
   wherein the one of points of the child node is a point with a lowest point index or a point with a greatest point index, and
   wherein the encoded geometry data and the encoded attribute data are included in a bitstream,
   wherein the bitstream includes information for representing that the attribute data is reconstructed based on a part of the octree, information related to a number of octree levels in the octree, and information for representing that the geometry data is partially decoded in the octree.

2. The method of claim 1,
   wherein the encoding of the geometry data comprises:
   representing the geometry data as layers based on the octree; and
   generating a geometry bitstream containing slices based on one layer or a group including one or more layers,
   wherein the encoding of the attribute data comprises:
   representing the attribute data as layers based on the octree; and
   generating an attribute bitstream containing slices based on one layer or a group including one or more layers.

3. The method of claim 2, further comprising:
   generating metadata related to the point cloud data,
   wherein the metadata contains information indicating a sampling position for eacha level of the octree for the attribute data, wherein the sampling position is a node baving a point with a lowest point index or a point with a greatest point index.

4. The method of claim 2, further comprising:
   generating metadata related to the point cloud data,
   wherein the metadata contains information indicating a sampling position for a level having a lower node of a root node of the octree for the attribute data.

5. A device for encoding point cloud data, the device comprising:
   a memory, and
   at least one processor connected to the memory, wherein the at least one processor is configured to:
   encode geometry data of point cloud data based on an octree;
   encode attribute data of the point cloud data,
   wherein the attribute data is encoded based on the octree,
   wherein a point of a parent node in a first octree level is obtained based on one of points of a child node in a second octree level,
   wherein the one of points of the child node is a point with a lowest point index or a point with a greatest point index,
   wherein the x geometry data and the de attribute data are included in a bitstream,
   wherein the bitstream includes information for representing that the attribute data is reconstructed based on a part of the octree, information related to a number of octree levels in the octree, and information for representing that the geometry data is partially decoded in the octree.

6. The device of claim 5,
   wherein the at least one processor is further configured to:
   represent the geometry data as layers based on the octree; and
   generate a geometry bitstream containing slices based on one layer or a group including one or more layers,
   wherein the at least one processor is further configured to:
   represent the attribute data as layers based on the octree; and
   generate an attribute bitstream containing slices based on one layer or a group including one or more layers.

7. The device of claim 6, wherein the at least one processor is further configured to transmit an entirety or part of the bitstream including the geometry bitstream and the attribute bitstream.

8. The device of claim 7, further comprising:
   a metadata generator configured to generate metadata related to the point cloud data,
   wherein the metadata contains information indicating a sampling position for each level of the octree for the attribute data, wherein the sampling position is a node having a point with a lowest point index or a point with a greatest point index.

9. The device of claim 7, further comprising:
   a metadata generator configured to generate metadata related to the point cloud data,
   wherein the metadata contains information indicating a sampling position for a level having a lower node of a root node of the octree for the attribute data.

10. A method of decoding point cloud data, the method comprising:
 decoding geometry data of point cloud data from a bitstream based on an octree; and
 decoding attribute data of the point cloud data,
 wherein the attribute data is decoded based on the octree,
 wherein a point of a parent node in a first octree level is obtained based on one of points of a child node in a second octree level,
 wherein the one of points of the child node is a point with a lowest point index or a point with a greatest point index, and
 wherein the bitstream includes information for representing that the attribute data is reconstructed based on a part of the octree, information related to a number of octree levels in the octree, and information for representing that the geometry data is partially decoded in the octree.

11. The method of claim 10,
 wherein the geometry data is represented as layers based on the octree and contained in a geometry bitstream containing slices based on one layer or a group including one or more layers,
 wherein the attribute data is represented as layers based on the octree and contained in an attribute bitstream containing slices based on one layer or a group including one or more layers.

12. The method of claim 11, further comprising:
 parsing metadata related to the point cloud data,
 wherein the metadata contains information indicating a sampling position for each level of the octree for the attribute data, wherein the sampling position is a node having a point with a lowest point index or a point with a greatest point index.

13. The method of claim 11, further comprising:
 parsing metadata related to the point cloud data,
 wherein the metadata contains information indicating a sampling position for a level having a lower node of a root node of the octree for the attribute data.

14. A device for decoding receiving-point cloud data, the device comprising:
 a memory; and
 at least one processor connected to the memory, wherein the at least one processor is configured to:
 decode geometry data of point cloud data from a bitstream based on an octree; and
 decode attribute data of the point cloud data,
 wherein the attribute data is decoded based on the octree,
 wherein a point of a parent node in a first octree level is obtained based on one of points of a child node in a second octree level,
 wherein the one of points of the child node is a point with a lowest point index or a point with a greatest point index, and
 wherein the bitstream includes information for representing that the attribute data is reconstructed based on a part of the octree, information related to a number of octree depths in the octree, and information for representing that the geometry data is partially decoded in the octree.

15. The device of claim 14,
 wherein the geometry data is represented as layers based on the octree and contained in a geometry bitstream containing slices based on one layer or a group including one or more layers,
 wherein the attribute data is represented as layers based on the octree and contained in an attribute bitstream containing slices based on one layer or a group including one or more layers.

* * * * *